Aug. 21, 1962 L. A. BUCKMINSTER 3,049,766
PROCESS AND APPARATUS FOR BLOCKING LENSES
Filed Jan. 27, 1960 7 Sheets-Sheet 1

INVENTOR.
LLOYD A. BUCKMINSTER
BY
Attorney

Aug. 21, 1962 L. A. BUCKMINSTER 3,049,766
PROCESS AND APPARATUS FOR BLOCKING LENSES
Filed Jan. 27, 1960 7 Sheets-Sheet 2

INVENTOR.
LLOYD A. BUCKMINSTER
BY
Attorney

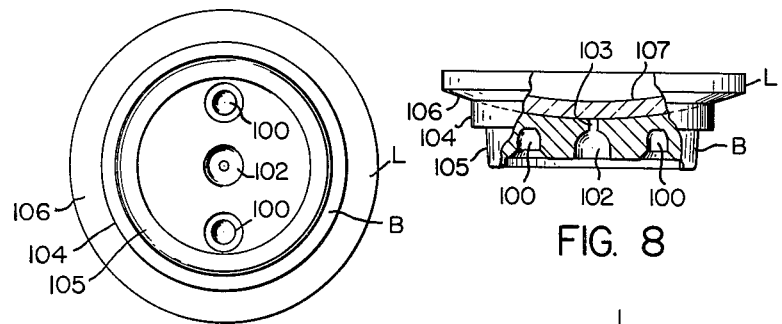
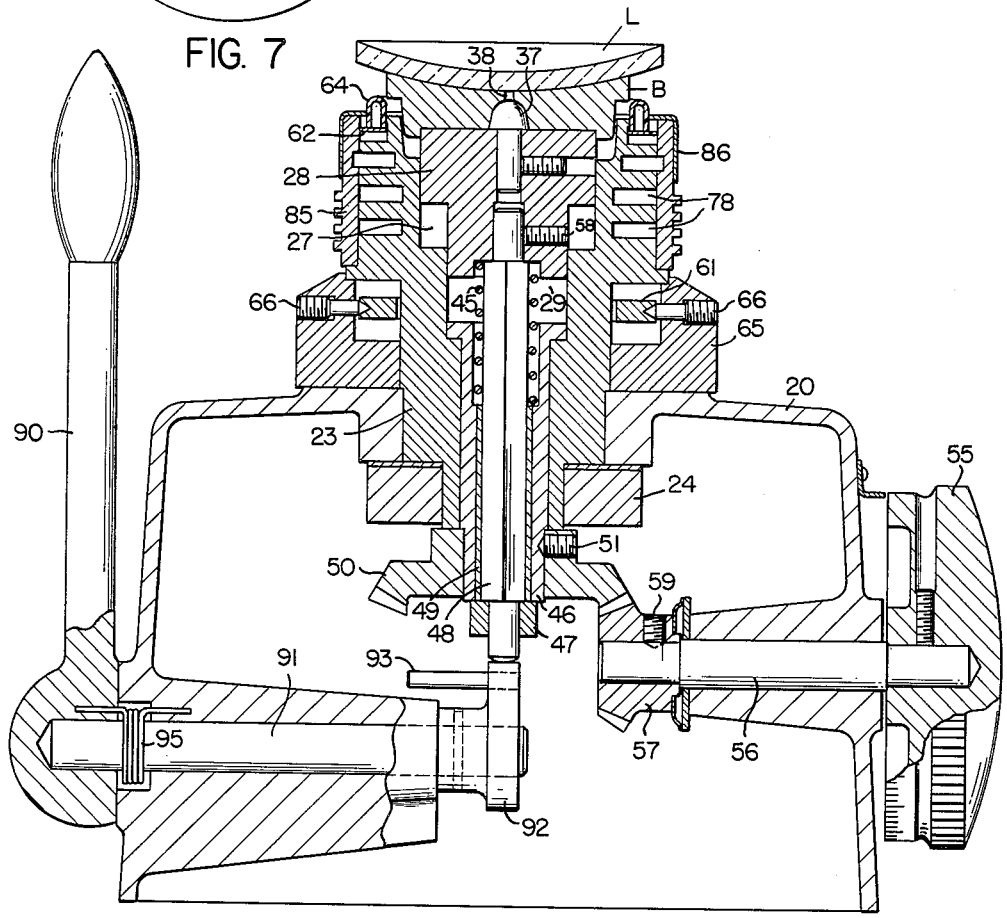

Aug. 21, 1962   L. A. BUCKMINSTER   3,049,766
PROCESS AND APPARATUS FOR BLOCKING LENSES
Filed Jan. 27, 1960   7 Sheets-Sheet 4

INVENTOR.
LLOYD A. BUCKMINSTER
BY
Attorney

INVENTOR.
LLOYD A. BUCKMINSTER

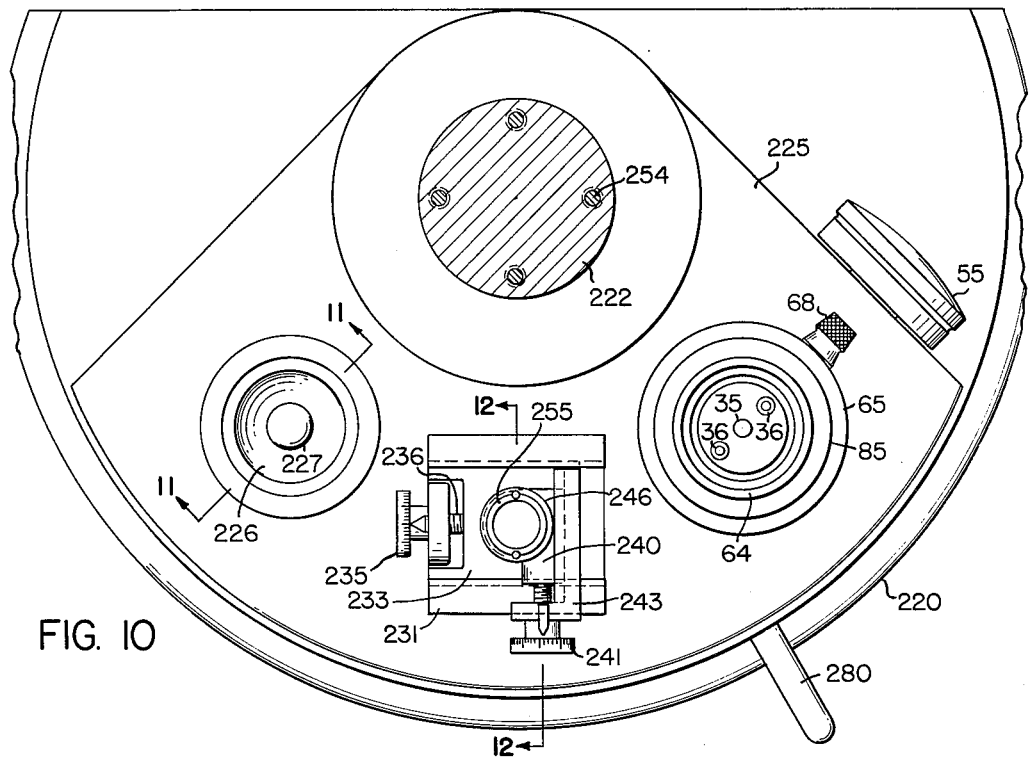
FIG. 10
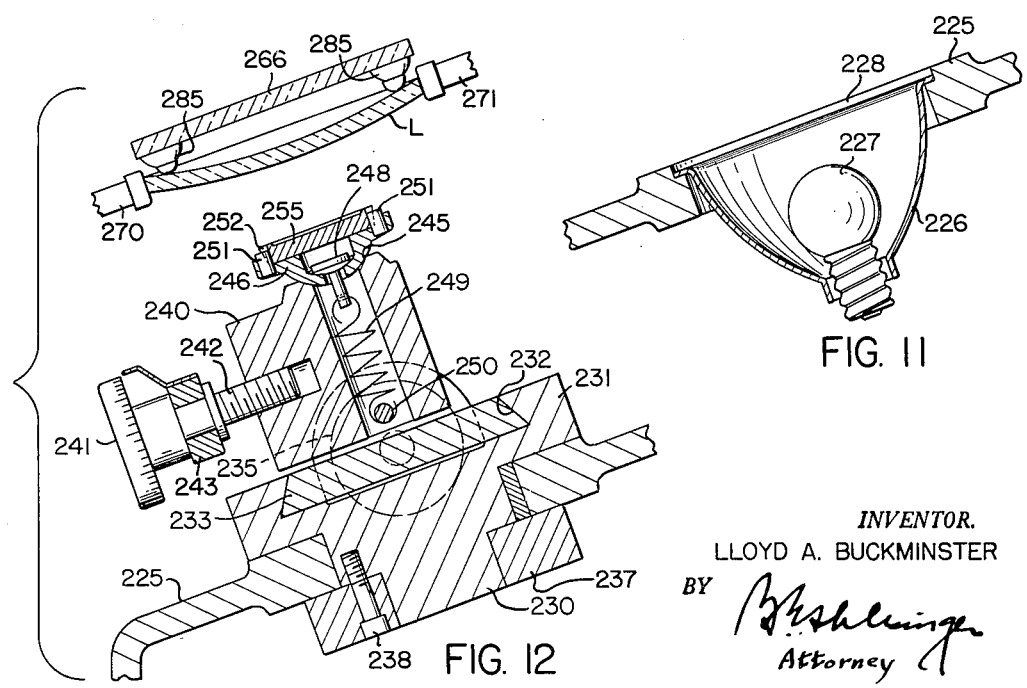
FIG. 11
FIG. 12
INVENTOR.
LLOYD A. BUCKMINSTER
BY
Attorney Aug. 21, 1962     L. A. BUCKMINSTER     3,049,766
PROCESS AND APPARATUS FOR BLOCKING LENSES
Filed Jan. 27, 1960     7 Sheets-Sheet 7

*INVENTOR.*
LLOYD A. BUCKMINSTER
BY
*Attorney*

United States Patent Office 3,049,766
Patented Aug. 21, 1962

3,049,766
PROCESS AND APPARATUS FOR BLOCKING LENSES
Lloyd A. Buckminster, Geneva, N.Y., assignor to Textron Inc., Geneva, N.Y., a corporation of Rhode Island
Filed Jan. 27, 1960, Ser. No. 4,950
15 Claims. (Cl. 22—58)

The present invention relates to the manufacture of lenses for spectacles, and more particularly to the blocking of lenses so that they can be chucked in the machines for generating and polishing their surfaces and for edge-grinding them.

In conventional processes for manufacturing an ophthalmic lens, a lens blank of molded glass is ground and polished on each of its two sides successively and then is ground on its perimeter or edge. Usually one side is concave and the other is convex; and the two surfaces have different curvatures so that the thickness of the lens varies at different points. The shapes and spatial relation of the two surfaces determine the desired optical refraction.

For the grinding and polishing operations, it is customary to secure the blank by means of an adhesive, such as molten pitch, to a lens block so that the lens may be chucked in the grinding and polishing machines. This block has, however, to be removed for edge-grinding the lens, and another block has to be used for this purpose. The block for holding the lens blank during surfacing has to be a large enough to back up the glass of the lens over substantially its whole area to avoid breakage, while the block used for holding the lens blank during edging has to be small enough to clear the grinding wheel during the edge-grinding operation.

The principal difficulty in blocking an ophthalmic lens is in connection with a semi-finished lens, that is, a lens blank one side surface of which has already been ground and polished. The operation of grinding and polishing the unfinished side of the lens is the more exacting operation because the second to-be-finished surface must not only have the correct curvature, but must bear an exact and precise relation to the first-finished surface, in order for the lens to have the ophthalmic properties desired. The precise location of the second surface with respect to the first may require either or both of two adjustments or settings, one called "axis" and the other called "prism." Setting for axis involves a rotation of the second surface with respect to the first, and setting for prism involves a tilting of the second surface with respect to the first. Adjustment for prism, as well as for axis, may be achieved in the blocking operation, if desired.

The manufacture of ophthalmic lenses is further complicated by the fact that the center used in the surfacing operation may be different from the center used in the finishing operation.

In any event, when surfacing a lens, the lens is mounted on the prepared optical center ordinarily. When edging a lens it may be necessary to use a different center, called a mechanical center, in order to conform to the interpupillary distance called for on the lens prescription for the two lenses of a pair.

In blocking the lens blank, the semi-finished lens must be affixed to the lens block with its finished side against the head of the block in a known relation to the block, in order that the opposite, unfinished side surface of the blank may be so finished as to bear the desired relation to the first-finished surface of the blank. For this purpose the first-finished surface of the semi-finished blank may be marked in a suitable marking device, preparatory to blocking the blank.

The blocking operation proper follows the marking of the semi-finished blank. Various ingenious and complicated blocking devices are known, in which the blank is held by gripping means which permit the operator to adjust the blank manually until the ink marks, that have been placed on the blank, are visually aligned with indicia on the blocking device. After the lens blank has been visually aligned, the operator coats the block with molten pitch, and then affixes the blank to the block.

In this way the finished surface of the semi-finished lens blank will be precisely positioned with respect to selected surfaces of the lens block. The selected block surfaces are then used to align the lens block in the chuck of the grinding or polishing machine, thus indirectly aligning the lens blank with respect to the chuck. In this way, the relation of the second surface to be generated to the first-finished surface is primarily determined during the blocking of the lens blank. As stated, however, with the prior method of lens blocking, it is necessary to use elaborate blocking devices and great care in blocking the semi-finished blank. Even then, errors in blocking are difficult to avoid.

For these reasons, chucks have been used in recent years in which the position of the lens blank in the chuck is determined directly by registering pins in the chuck which engage against the finished lens surface of the blocked lens blank. With these chucks, prism settings may be made directly in the chuck itself, and thus blocking is simplified. These chucks are, however, somewhat complex mechanically, and expensive.

Aside from the above-mentioned problems relating to the fixing of the lens correctly on the lens block and in the chucks, there are other difficulties attendant upon prior blocking practice. For instance, in prior blocking practice the blocking bodies are used over and over again. The result is that they get beat-up in use. This affects the accuracy of the centering of a lens in the different machines in which it is to be worked, with the result that it affects the accuracy of the lens itself.

Furthermore, as stated above, in manufacturing a lens for spectacles, it is necessary to have two different diameters of chucking surfaces, one for holding the lens during generation and surfacing, and the other for holding the lens during edging. The block for holding the lens during surfacing is too large for edging.

The practice heretofore has been to lay the lens out and to mark it, then to block it with pitch on the mounting block, then to surface it, then to take it off the blocking body, to measure it, then to remark it for the finishing operation, and then to effect edging. Each time that the lens has to be removed from a block, however, it entails the irksome job of cleaning pitch off the lens and off the block; and each time that a lens has to be blocked it involves the nasty job of applying pitch to the lens or block.

A prime object of the present invention is to provide a method for lens blocking which will insure, in effect, a new block each time that the lens is blocked for a surfacing or generating operation.

Another object of the invention is to provide a method of lens blocking which will insure closer control on the edging operation.

Another object of the invention is to attach to the lens blank in one operation a block suitable for holding the lens during surfacing and generation, and a second block suitable for holding the lens during edging.

Another object of the invention is to eliminate the second marking operation heretofore required, and to reduce the handling time previously necessary.

Another object of the invention is to provide a method of lens blocking which eliminates the second checking and second laying out previously required, and which makes one man responsible for the accuracy of the layout and of the complete operation.

Another object of the invention is to provide a lens blocking operation by which a lens may be blocked with the required prism, thereby eliminating the necessity for adjusting the lens chuck so as to secure the desired amount of prism.

Another object of the invention is to provide a lens block which will enable the thickness of a lens to be measured while the lens is affixed to the block.

Other objects of the invention will be apparent hereinafter from the specification and from the recital of the appended claims when considered in conjunction with the accompanying drawings.

In the drawings:

FIG. 3 is a section through the base of the machine taken at right angles to the section of FIG. 2 and on a still somewhat further enlarged scale and showing the blocked lens stripped from the mold;

FIG. 7 is a bottom plan view on the scale of FIG. 3 showing a lens block such as may be made on the machine of FIGS. 1 to 5 inclusive, and showing a lens secured thereto;

FIG. 8 is a part side elevation, part diametral sectional view of the lens and this block;

FIG. 10 is a fragmentary horizontal section through the machine showing particularly in plan the turret of this machine;

FIG. 11 is a fragmentary sectional view through the turret taken on the line 11—11 of FIG. 10;

FIG. 12 is a fragmentary sectional view taken on the line 12—12 of FIG. 10 and showing, also, the lens in position above the block;

Figure 1:
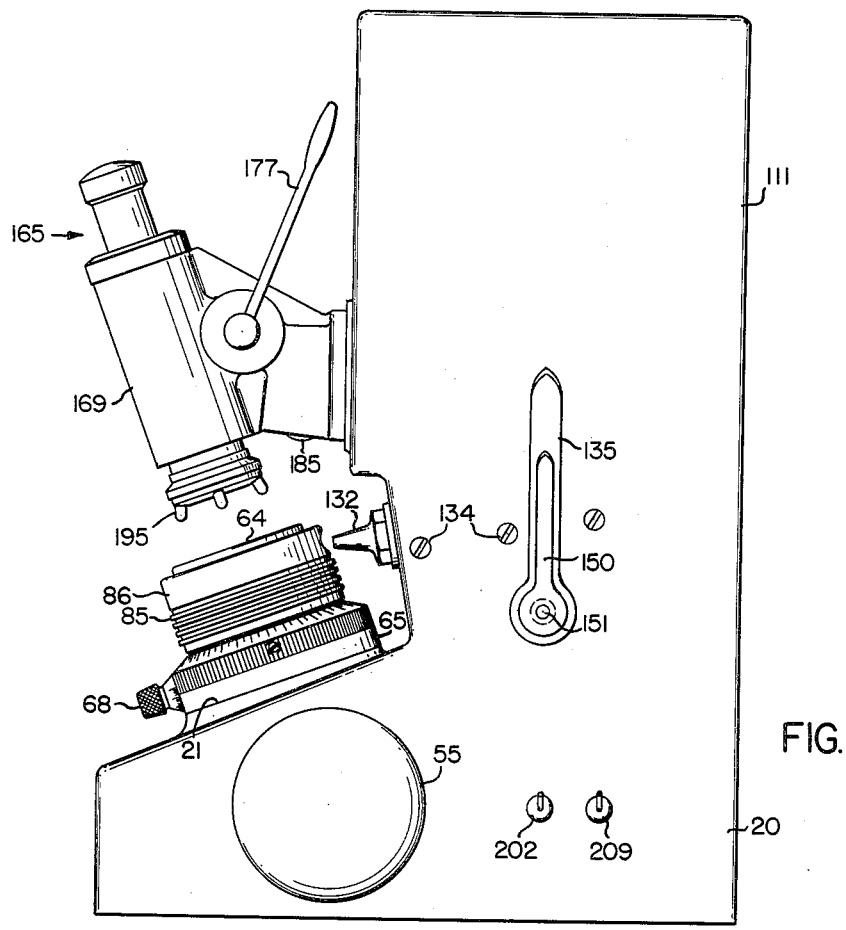
FIG. 1 is a side elevation of a lens-blocking machine constructed according to one embodiment of this invention.

In the process of blocking a lens blank according to this invention, the lens blank is held in position on top of a mold, and a heated low-melting-point alloy is flowed into the mold under one side of the lens blank, and is then allowed to cool adhering itself to the blank. The mold is shaped so that the alloy will cool to the shape of a lens block.

In the embodiment of this invention, which is illustrated in FIGS. 1 to 6 inclusive, the molded block is of a type that will serve only during generating and polishing of the upper unfinished side surface of the lens blank. For edging, this molded block has to be removed, and the edging operation has to be carried out in the usual manner.

In the embodiment of the invention illustrated in FIGS. 6 and 9 to 13 inclusive, a small-sized block, such as is conventionally used for holding a lens blank for edging the blank, is first adhered to the blank by pitch or any suitable adhesive. Then the blank, with this block affixed thereto, is placed on top of a mold, and a melted low-melting point alloy is poured into the mold around the small-sized block to form the block that is used during generating and finishing the exposed upper face of the blank.

In either case after the molded block has served its purpose, it can readily be removed from the lens blank, as, for instance, by putting it into a small vice and squeezing on the block to cause it to break away clear of the blank. The removed block can be melted down again and used in molding another block for another lens blank. Thus, each time a lens blank is blocked by the process of the present invention, a new, clean, unmarred, accurate block is provided.

FIGS. 1 to 6 inclusive show one form of apparatus for molding lens blocks according to this invention. Mounted directly on the molding apparatus is a suitable sighting device provided with an eyepiece and a reticle for aid in aligning the lens blank. Mounted beneath the sighting device is a mold. The lens blank is seated on top of the mold cavity on a resilient ring, which surrounds the mold cavity, and which constitutes a wall to contain the molten alloy. The seating ring is mounted so that it can be tilted to any angle to adjust the blank for the desired amount of prism and prism axis; and part of the mold itself is rotatably adjustable about an axis disposed at right angles to the axis of tilt of the ring, so that the lens block can be molded for the desired "axis" position.

The blank is adapted to be held on the seating ring by rubber-tipped pins that are carried on the bottom side of a clamping ring that is disposed on the bottom of an axially-adjustable tube forming part of the sighting device. The required adjustments for "axis" and "prism" are made; and the tube of the sighting device is lowered to bring the pins into engagement with the upper surface of the lens blank. The clamping ring is mounted on the bottom of the sighting device on a universal joint so that the clamping ring and pins accommodate themselves to the adjusted position of the lens blank.

Mounted in the mold for axial reciprocation therein is a piston which carries three pins that extend into the mold cavity. These pins are in line diametrally of the mold. The two outside pins serve to form in the molded lens block recesses for centering the lens on a generating or polishing machine if a toric lens is to be ground. The center pin serves to form a recess in the molded block by which the blank can be chucked in a spherical grinding machine if a spherical lens surface is to be ground. The center pin has a teat on it which extends into the mold cavity far enough to engage the underside of the lens blank. This center pin, therefore, serves to form a recess in the molded block which extends to the very undersurface of the lens blank and which permits a caliper to be used for measuring the thickness of the blank without removing the blank from the molded block.

For supplying the molten metal to the mold, a hopper is mounted in a column on which the sighting device is secured. The hopper is intended to receive chunks of metal alloy, including previously-used lens blocks. The hopper has a heater secured to it for melting down the chunks of metal. Reciprocably mounted in the column beneath the hopper is a tank or container for receiving molten metal from the hopper. The tank is provided with a nozzle through which the metal may flow into the mold; and a manually-operable valve is provided that normally is closed to prevent flow of metal from the tank into the mold. A manually-operable lever is provided for moving the nozzle into an opening in one side of the mold; and then the valve is opened to permit flow of the molten metal from the tank into the mold cavity to fill the mold cavity. Means is provided for flowing water or other coolant around the mold, when the pouring operation is completed, to solidify the molten mass thereby to form the lens block and adhere it to the lens blank. The tank and its nozzle are then retracted to withdraw the nozzle from the mold. The piston is then moved upwardly in the mold (the lens holding pins having been retracted) to strip the now-completed lens block from the mold.

To prevent overflow of the tank and yet to keep a desired amount of molten alloy in the tank at all times two probes are mounted in the tank. One probe is mounted near the top of the tank to shut off the heater on the hopper when the level of molten metal in the tank reaches this upper probe. The other probe is mounted near the bottom of the tank, and insures an adequate supply of molten metal at all times in the tank during operation of the apparatus. Heaters are also provided in the tank. These are turned on when the main switch of the apparatus is closed, to melt down any residue of metal in the tank. A thermostat is provided on the tank to control these heaters, and the temperature of the metal.

The molding apparatus comprised in the embodiment of the invention shown in FIGS. 9 to 13 inclusive is like that disclosed in FIGS. 1 to 6 inclusive and operates in the same way. However, in the embodiment of the invention shown in FIGS. 9 to 13, the mold is mounted on a turret, which also holds a light for illuminating the sighting device, and an adjustable support for positioning an edging lens block correctly with reference to the lens blank that is to be blocked. The sighting device is provided with adjustable clamps for holding the lens.

In use of the apparatus shown in FIGS. 9 to 13 inclusive, the turret is first adjusted angularly to bring the light, which is carried thereby, under the lens blank which is held in the clamps of the sighting device; and these clamps are adjusted to shift the lens blank until its surfacing center is properly located. Then the turret is indexed to bring the adjustable support with a small edging-type lens block mounted thereon into position under the sighting device. The support is then adjusted, using the sighting device, to locate this lens block with its center at the center of the finishing or edging center of the lens blank, which is offset from the surfacing center. The lens blank is then secured to this block by pitch or other suitable adhesive. The turret is then indexed to bring the lens blank and the block over the mold; and, after the adjustments for "axis" and "prism" are made, the surfacing block is molded around the edging block in the manner described above with reference to FIGS. 1 to 6.

Figure 2:
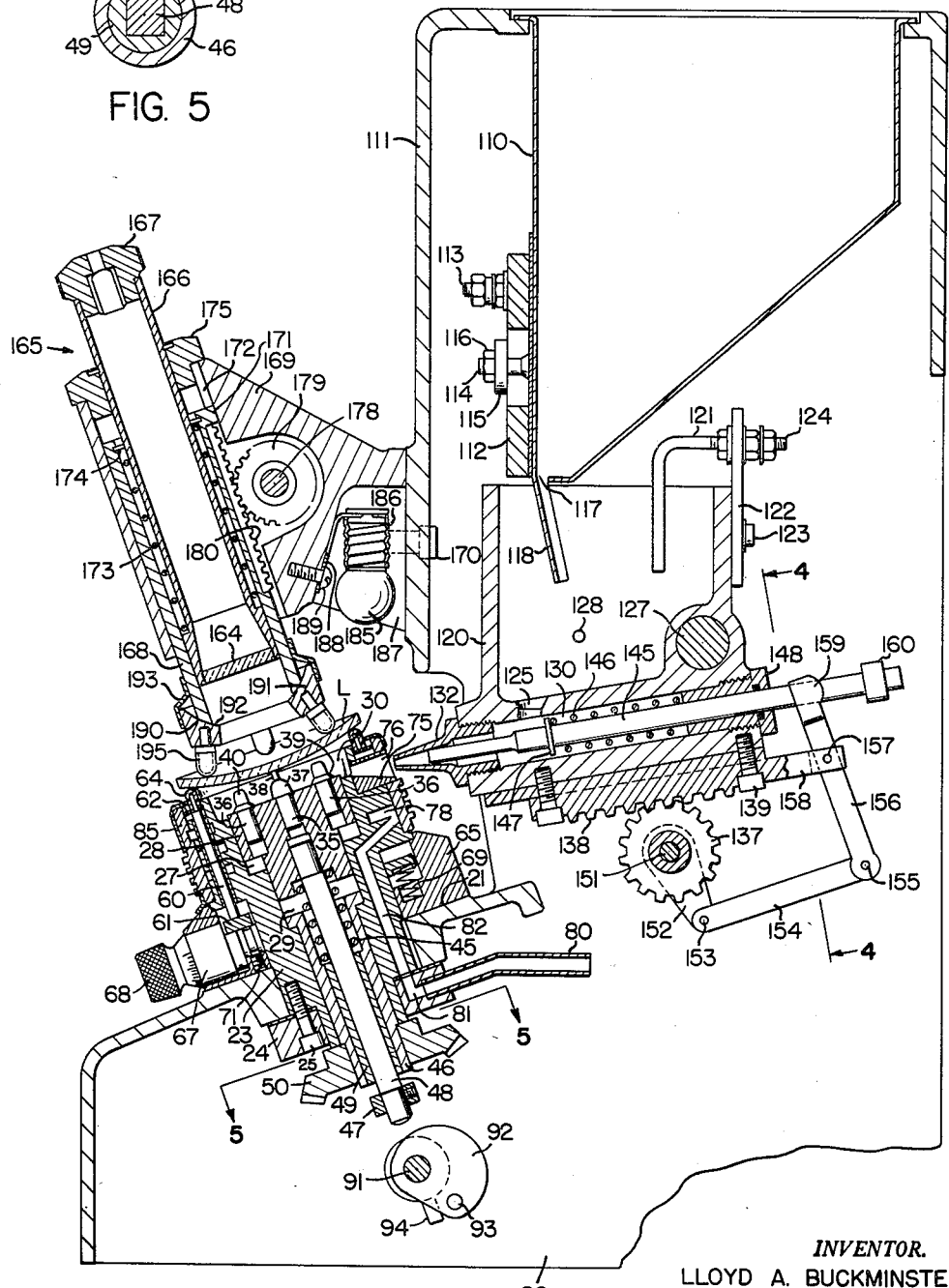
FIG. 2 is a vertical section through this machine on a somewhat enlarged scale.

Referring now to the drawings by numerals of reference, and first to the embodiment of the invention illustrated in FIGS. 1 to 3 inclusive, 20 denotes the base of a lens blocker constructed according to one embodiment of this invention. A portion of the upper surface 21 of the base is inclined to the horizontal. Mounted in the base, and keyed against rotation relative thereto is a block mold 23. This mold is held against upward movement by a collar 24 which is fastened to the mold by screws 25, and which engages under the inclined top wall of the base. Mounted to reciprocate in a counterbore 27 in the upper end of the mold is a piston 28. The piston is of reduced diameter at its lower end; and the reduced diameter portion of the piston is adapted to slide in the guide bore 29 of the mold. The counterbore 27 communicates with the guide bore 29 at its lower end; and at its upper end communicates with the mold cavity 30 in the upper end of the mold. Guide bore 29 communicates at its lower end with the reduced-diameter coaxial main bore of the mold.

Secured in the upper end of the piston 28 are three pins. These pins are arranged diametrally of the piston, and each has a pressed fit in the piston. The two end pins 36 are alike. Each has a truncated conical portion 39 seating against the upper face of the piston and projecting thereabove. Each has a dome-shaped portion 40 above its conical portion 39. The center pin 35 has, however, no conical portion but has a dome-shaped head 37 seating directly against the upper face of the piston; and from this head there extends an upwardly projecting teat 38. The heads of the three pins project into the mold cavity 30.

The piston 28 is constantly urged upwardly by a coil spring 45, which seats at its upper end in a recess in the bottom of the piston and which is interposed between the bottom of the piston and the base of a counterbore in a sleeve 46. Upward movement of the piston is limited by a collar 47 which is secured by a setscrew to a rod 48 that slides in a bushing 49 in the sleeve 46. Rod 48 has a pressed fit at its upper end in a counterbore in the piston 28. The sleeve 46 has an integral collar formed on it at its upper end which engages in guide bore 29 to prevent the sleeve from dropping out of the main bore of the mold. The sleeve is journaled in the main bore of the mold 23, and has a beveled gear 50 fastened to it at its lower end by a setscrew 51 (FIG. 3).

The piston 28 is rotatable in the mold by means of a knurled knob 55 (FIG. 3) which is secured by means of a setscrew to a shaft 56 that extends at right angles to the rod or shaft 48. Shaft 56 has a bevel pinion 57 secured thereto by a setscrew 59. The pinion 57 meshes with the bevel gear 50 that is keyed to sleeve 46.

Figure 5:
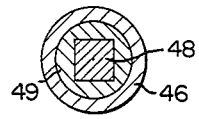
FIG. 5 is a section on the line 5—5 of FIG. 2 looking in the direction of the arrows.

Rod or shaft 48 is square in cross section; and the bushing 49 has, as shown in FIG. 5, a correspondingly square bore. When the bevel gear 50 is rotated, then, it imparts rotation to the sleeve 46 and rod 48 through the bushing 49. The rod 48 is secured at its upper end to the piston 28 against rotation relative thereto by a setscrew 58. Hence, rotation of the bevel gear 50 rotates the piston 28 in the mold 23. This locates the pins 36 angularly about the axis of the piston; thereby determining the angular position, which the molded lens block will occupy in the chuck of a lens manufacturing machine. Thus, the angular position of the piston determines the "axis" of the lens being manufactured.

Mounted to reciprocate in the piston are four equiangularly spaced prism pins 60. Only one of these is shown in FIG. 2. These rest at their lower ends on a prism adjusting plate or table 61, and engage at their upper ends against a disc or washer 62 to which is secured a rubber or neoprene seal ring 64. The lens L, which is to be blocked, is seated on the seal ring 64 for the molding operation.

The prism adjusting table or plate 61 is mounted in a counterbore in the graduated prism axis ring 65. It is pivotally mounted on two diametrally opposed pivot screws 66 that thread into ring 65. It rests at one side of its pivotal axis on the cam portion of a prism adjusting cam 67. This cam is rotatably mounted in ring 65, and is adapted to be rotated by the integral knurled knob 68. At the diametrically opposite side of its pivotal axis, the prism table or plate 61 seats on a coil spring 69, which is mounted in a socket in the ring 65 and which is interposed between the plate and the bottom of this socket.

The mold 23 has a nozzle seat 75 welded or brazed to it at one side. This seat is formed with a port 76 through which the molten metal, which is to form the lens block, is flowed into the mold cavity 30. To maintain the mold cool during the casting operation, and to harden the molten metal in the mold cavity 30, thereby to form the lens block, the mold is provided with peripheral grooves 78 around it at its top, and water or another suitable coolant, is supplied to these grooves from a conduit 80 which is connected with the collar 24. There is a duct 81 in the collar which communicates with the duct 82 in the mold. The duct 82 leads to the peripheral grooves 78 of the mold. The water flows out of the mold through another conduit not shown. To carry off the heat more effectively, there is a finned sleeve 85 mounted around the mold. A cap 86 fits over the top of sleeve 85 to retain plate 62 and seal 64 on the mold.

After the molded block has cooled, the block is stripped from the mold cavity by forcing the rod 48 upwardly, thereby to push the piston 28 upwardly. The rod 48 is moved upwardly by manual operation of a lever 90, which is secured to a shaft 91 that is journaled in the base of the machine. This shaft has a cam 92 pinned to it which is positioned to engage the lower end of the rod 48. A coil spring 95, which surrounds the shaft 91 and which is engaged at one end in the lever arm 90 and at its opposite end in the base 20, serves to urge the shaft constantly to its zero position where the cam 92, as shown in FIG. 2, is out of engagement with the rod 48. A pin 93, which is secured in the cam, is adapted to engage against a lug 94 in the base to limit the return movement of the shaft 91.

The material used for forming the lens blocks is a low melting point, electrically-conductive alloy made, for instance, of a mixture of bismuth, lead, tin, indium and cadmium. The alloy which is preferably used, has a melting point of 136° F. Pieces of the alloy, and/or previously used lens blocks, are dumped into a hopper 110, and melted down to provide the material for the lens blocks.

The hopper 110 is carried in a column 111 which is integral with the base of the machine and which extends vertically thereabove. Mounted on one side of the hopper is a conventional ring heater element 112 (FIG. 2) which supplies sufficient heat to the hopper, when energized, to melt down the metal in the hopper. The heating element can be connected to any suitable source of electrical energy by terminals 113. It is removably secured to the hopper by the stud 114, washer 115 and nut 116. The nut 116 threads onto the stud 114.

The molten metal flows from the hopper through a port 117 in the bottom thereof into a tank or receptacle 120. A deflector 118, which is integral with one side wall of the hopper, serves to deflect the molten metal into the center of the tank.

Mounted on the tank near the top thereof is a probe 121. This probe is connected, as will be described further hereinafter, in such wise as to control the flow of current to the heater ring 112. The probe 121 is mounted on a bracket 122 which is secured by a screw 123 to one side wall of the receptacle. This probe is integral with a terminal 124.

The probe 121 extends only a short distance down into the tank 120. Below it and extending into the tank just above the bottom of the tank is a second probe 128 whose terminal is not shown.

Mounted in the rear wall of the tank to project into the receptacle are a pair of heating elements 126 (FIG. 4); and mounted in the rear, also, of the receptacle is a thermostatic element 127. The tank is grounded as will be described further hereinafter.

The inside bottom wall of the receptacle is inclined downwardly from right to left as seen in FIG. 2. In its bottom left-hand corner the tank has a port 125 through which the molten metal flows from the receptacle into a cylinder 130. This cylinder is integral with the tank.

The cylinder 130 is inclined slightly downwardly so that the molten metal will flow toward the lower left-hand end of the cylinder. Threaded into the left-hand end of the cylinder is a nozzle 132 which is adapted to enter into the nozzle seat 75.

The tank is mounted slidably in the column 111 for movement toward and from the mold to move the nozzle 132 into and out of the nozzle seat 75. In this movement it slides on ways 133 secured by screws 134 (FIGS. 1 and 4) to opposite side walls of the column. These straddle the receptacle. The reciprocating movement of the receptacle is achieved by movement of a lever 135 (FIGS. 1 and 4) which is keyed to a sleeve 136 that has a spur gear 137 secured to it. This gear meshes with a rack 138 (FIG. 2) that is secured by screws 139 beneath the bottom of the receptacle.

The nozzle 132 is adapted to be closed by a reciprocable valve rod 145 (FIG. 2). A coil spring 146, which surrounds the valve rod and which is interposed between a washer 147 and a nut 148, serves constantly to urge the valve rod 145 to closed position. The washer 147 is fixedly secured to the valve rod 145 intermediate its ends; and the nut 148 is threaded into the end of the cylinder 130 opposite to that into which the nozzle 132 is threaded.

Figure 4:
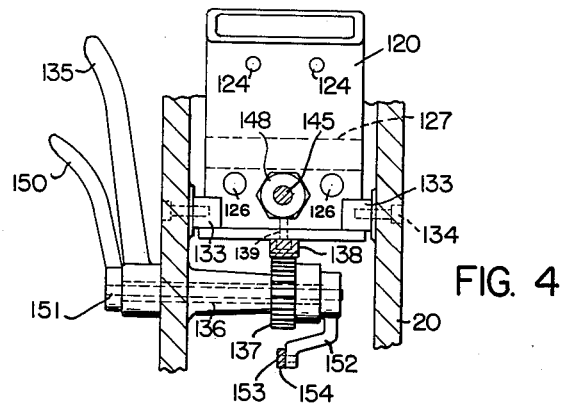
FIG. 4 is a fragmentary section on the line 4—4 of FIG. 2 looking in the direction of the arrows.

The valve rod 145 is adapted to be moved to opened position against the resistance of the spring 146 by a hand lever 150 (FIG. 4). This lever is secured to a shaft 151 which is journaled in the tubular shaft 136. Secured to the inner end of the shaft 151 is a lever arm 152. Pivotally connected to the free end of this lever arm by a pin 153 is one end of a link 154 (FIG. 2). The link is pivotally connected at its opposite end by means of a pin 155 to a lever 156 which is pivotally connected intermediate its ends by means of a pin 157 to a lug 158 which is integral with and projects rearwardly from the rack 138. The lever 156 is forked at its upper end and straddles the valve rod 145. By rocking the hand lever 150 clockwise from the position shown in FIG. 1, the lever 156 will also be rocked clockwise to engage its rounded furcations 159 with a collar 160 that is secured to the valve rod 145. Thereby the valve rod may be moved rearwardly against the resistance of spring 146 to open the nozzle 132 for flow of the molten metal from the cylinder 130 through the nozzle seat 75 into the cavity 30 of the mold when the nozzle is engaged in the nozzle seat 75. The nozzle 132 is first positioned in the nozzle seat, and then the valve rod 145 is opened to permit flow of the molten metal into the mold cavity.

For accurately positioning the lens L on the seal 64 a sighting device, denoted at 165 (FIG. 2), is provided. The structure of this sighting device is conventional and forms no part of the present invention. Suffice it to say that the lens elements, including the reticle 164, of the sighting device are mounted in the tube 166 whose eyepiece is denoted at 167. The tube 166 is mounted against rotation in a tube 168 that is reciprocably adjustable axially in a bracket 169 that is secured by screws 170 to one side of the column 111. The tube 168 has a key 171 integral with it which engages in a key slot 172 in the bracket so as to prevent rotation of the tube 168 relative to the bracket. A coil spring 173, which is interposed between a shoulder on the tube 166 and a spring washer 174, that is secured in the upper end of the tube 168, serves constantly to urge the tube 168 upwardly. The upward movement of the tube 168 is limited by a cap or nut 175 that is secured in the upper end of the bore of the bracket 169 in which the tube 168 is reciprocably mounted, and that is positioned to engage the upper end of the tube 168.

The tube 168 can be moved axially in either direction by a hand lever 177 (FIG. 1), which is keyed or otherwise fixed to a shaft 178 (FIG. 2). A pinion 179, which is secured to this shaft, meshes with a rack 180 that is provided at one side of the tube 168.

A lamp bulb 185, which is threaded into a socket 186, serves to illuminate the sighting device for viewing. The socket 186 is carried in a recess 187 in the bracket 169 by an angle plate 188 which is secured to the bracket by a screw 189.

The tube 168 is formed at its lower end with a convex spherical surface 190. Seated on the lower end of the tube is a ring 191 which has a mating concave upper spherical surface 192. The ring is held on the tube by a rubber collar 193 which has a tight fit at its upper end to the tube 168 and at its lower end to the ring 191.

The ring 191 carries a plurality of rubber-tipped pins 195 which project therebelow and which are adapted to engage the upper face of the lens L, which is to be blocked, to clamp the lens on the sealing ring 64 firmly when the tube 168 is lowered. These pins 195 diverge downwardly from one another so that at their tips they have proper contact with the upper curved surface of the lens.

Figure 6:
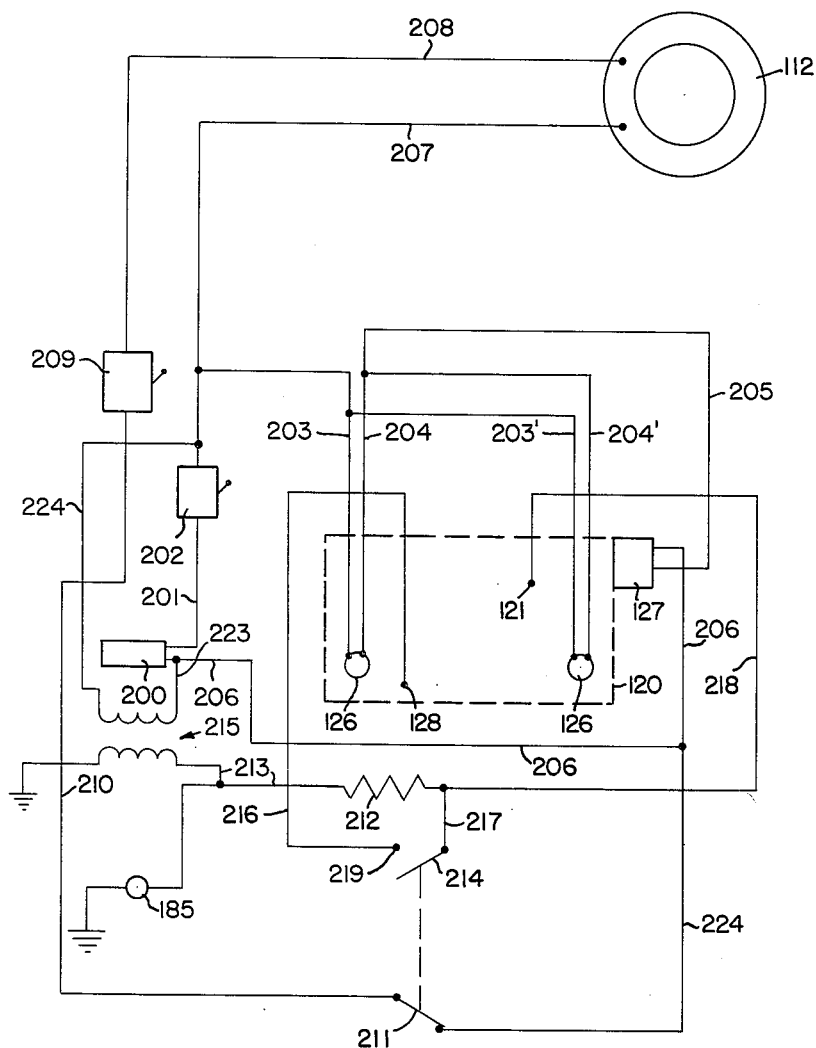
FIG. 6 is an electrical diagram showing one way in which this machine may be wired electrically to accomplish its purpose.

One way in which the apparatus may be wired to accomplish its purpose is shown in FIG. 6.

Here 200 denotes a plug which may be plugged into any convenient outlet for connection of the apparatus to a suitable source of current. Plug 200 is connected by a line 201 with a conventional on-and-off switch 202. Switch 202 is connected by line 203 with one of the heaters 126 of the pot or tank 120, and is connected by the line 203' with the other heater 126 for the pot or tank. The heaters 126 are connected by lines 204 and 204', respectively, with line 205 which leads to thermostat 127. This thermostat is connected by line 206 with plug 200. Hence, when the switch of the thermostat is closed, the heaters 126 will be energized to apply heat to the metal in pot 120.

The switch 202 is also connected by line 207 to one side of ring heater 112. This ring heater is connected in turn by line 208 to a normally-closed manually-operable switch 209. Switch 209 is provided to permit of manually shutting off the heater when desired. Switch 209 is connected by a line 210 with the normally-closed arm 211 of a conventional relay, the coil of which is denoted at 212.

The relay coil is connected at one side to the secondary of a transformer 215 which, in turn, is connected to ground. The primary of this transformer is connected by line 223 with line 206, and is connected by line 224 with line 207. On its other side it is connected to upper probe 121 by line 218. The lower probe 128 is connected by line 216 to a terminal 219. As already stated, the tank 120 is grounded.

When the main line switch 202 is closed, the ring heater 112 is energized, causing the metal in the hopper 110 to be melted. The molten metal flows from the hopper into the tank 120. The metal used for blocking is a conductor. The relay coil 212 is energized when the molten metal in the tank 120 reaches the height of the upper probe 121, a circuit being made from the secondary of transformer coil 215, line 213, relay coil 212, line 218, probe 121, the molten metal in the tank, and to ground through the tank itself which is grounded. When energized, the coil 212 opens the normally-closed relay arm 211 and closes a normally-open relay arm 214. Arm 211 when opened, shuts off heater 112. Arm 214, when closed, makes contact at 219 and closes a hold-in circuit to the relay 212 to keep the heater shut off. This hold in circuit is from the secondary of transformer 215 through line 213, relay coil 212, line 217, switch arm 214, line 216, the lower probe 128, the molten metal in tank 120 through the tank to ground.

When the level of molten metal in the tank 120 falls below the level of the lower probe 128, the relay coil 212 is deenergized, and the arm 214 drops out of contact at 219, while the arm 211 makes contact again to close the circuit again to heater 112. Thus, the heater 112 will again be energized to melt the metal in the hopper 110 to cause it to flow into the tank 120 to replenish the supply of molten metal in the tank 120. Heater 112 remains on until the level of metal in the tank again rises to the height of the upper probe 121. Then heater 112 is shut off again as above described.

Light 185 is turned on when main switch 202 is closed. This light is connected at one side to the secondary of the transformer 215 through line 223. At its other side it is connected to ground.

The operation of the apparatus of FIGS. 1 to 6 will be obvious from the preceding description, but may be summed up briefly here.

The operator puts a lens blank L on the sealing ring 30, and sights through the sighting device to locate the center of the lens. The operator then adjusts piston 28 rotatably by turning knurled knob 55, pinion 57 and gear 56 and while sighting through the eyepiece 167, to position pins 36 for the desired 180° "axis." He also adjusts the prism axis ring 65 rotatably, and the prism adjusting cam 67 rotatably, if prism is desired, until upper surface of the lens blank has the proper tilt for its desired "prism." He then adjusts the sighting device 165 down until its pins 195 clamp the lens blank on the sealing ring. Then the operator rocks lever 135 to move nozzle 132 into the nozzle opening 76 of the mold, and opens valve rod 145.

This permits the molten metal to flow from tank 120 and cylinder 130 into the mold cavity 30. When the mold cavity is filled with the molten metal, the valve rod 145 is moved to closed position again; and when the molten metal has hardened in the mold cavity, which can be determined with a stop watch, the tank 120 and nozzle 132 are retracted; and the lever 180 is moved to cause cam 92 to move piston 28 upwardly to strip the now-molded block and the lens blank, to which it is attached, from the mold. Through the electric circuitry described a sufficient supply of molten metal is always provided in tank 120 so long as there is metal in the hopper 110.

When the molding operation is completed, a block B will be formed (FIGS. 7 and 8), to which the lens L will have been secured. This block has a head 104, to which the underface 106 of the lens is attached, and a shank 105 by which the block may be chucked. The block is provided with three diametral holes corresponding to the pins 35 and 36. The two end holes 100 are for receiving the driving pins of the spindle or arbor of the generating or surfacing machine. The middle hole is adapted to receive the driving pin of a sphere surfacer when a spherical surface is to be ground on the lens blank. The middle hole 102 has a reduced diameter portion 103 at its upper end which opens onto the lower surface of the lens. By engaging one jaw or feeler of a caliper with the underside of the lens through this hole, and engaging the other jaw or feeler of the caliper with the upper side of the lens, the thickness of the lens can be measured. Previously it was impossible to measure a lens once it had been blocked, without removing the lens from the block.

Referring now to the modification of the invention shown in FIG. 9 to 13 inclusive, 220 denotes the base of the machine. Secured to this base by means of screws 221 is a trunnion post 222. Oscillatably mounted on the base 220 for rotation about the post 222 is a turret 225.

Mounted on this turret 225 is a reflector 226 (FIGS. 10 and 11) in which there is screwed a light bulb 227. The reflector may be covered by a protective glass 228.

Mounted on the turret and angularly spaced from the reflector 226 about the axis of the post 222 is a support 230 which is keyed in the turret against rotation, and which is held securely on the turret by collar 237 and screws 238 (FIG. 12). Above the turret, support 230 is formed with a guide member 231 that has a dove-tailed guide groove 232 in it that receives a slide 233 which is formed with a correspondingly dove-tailed guide portion. The dove-tailed guide member is adapted to be adjusted on the base 231 by a graduated knob 235 (FIGS. 10 and 12). This knob is secured to one end of a screw 236 that is journaled in the base and that threads into the slide 233. Slidably mounted on the slide 233 for adjustment at right angles to the direction of adjustment of the slide 233 is a second slide 240. This slide is adjusted by means of a graduated knob 241 which is secured to a screw shaft 242 that is journaled in a projection 243 of the slide 233 and that threads into the slide 240. The upper surface of the slide 240 is formed with a concave spherical socket 245 on which is mounted a holder 246 that has a convex spherical lower surface seating on the socket 245. The holder 246 is adjustable angularly in the socket 245 and is resiliently held in any adjusted position by means of the headed member 248 which has a convex spherical undersurface. A coil spring 249 is secured at its upper end to this headed member, and at its lower end to a pin 250 that is fastened in the slide 240.

The disc or block 255, which is used for chucking the blank when edge grinding, is adapted to be held on the holder 246 by cylindrical positioning pins 251 which are fastened in the holder and which engage in peripheral slots 252 in the block that are downwardly of progressively decreasing area. Block or disc 255 may be made of plastic, or of a metal with a higher melting point than the alloy which is put into hopper 110.

Mounted on the turret 225 but spaced angularly therefrom and with its center line at the same radial distance from the axis of the post 222 as the center line of the holder 230 and the center line of the reflector 226 is a mold, which may be identical in construction with that already described with reference to FIGS. 1 to 5 inclusive. This mold accordingly is shown only in elevation in FIG. 9. Its parts are identified by the same reference numerals as employed in FIGS. 1, 2 and 3.

Mounted on the post 222 above the turret 225 and secured to the post by screws 254 is a column 256 which is substantially the same in construction as the column 111. Mounted in the column 256 are a hopper, a receptacle, a cylinder and a nozzle, which may be identical with those previously described, and which, therefore, need not be further illustrated.

Secured to one side of the column is a bracket 260. Mounted on this bracket to slide vertically thereon is an optical sighting device 261 which is formed at one side with a rack 262 with which the pinion 263 engages. The pinion 263 may be rotated by a hand lever 264 to move the member 261 up and down.

The member 261 has a magnifying glass 265 at its top and an optical grid 266 (FIGS. 9 and 13) at its bottom. The lens L, which is to be blocked, is adapted to be held in four jaws, only three of which are shown and which are designated, respectively, at 269, 270 and 271. Jaws 270 and 271 are diametrically opposite one another and are pivoted at 272 and 273, respectively, on the outside of the holder 261. The jaw 271 is constantly urged clockwise about its pivot 273 by a coil spring 275. The jaw 270 is adjustable about its pivot 272 by a knurl headed screw 276 which threads into the upper end of the jaw and seats against a pad 277 formed on the outside of the part 261.

Figure 9:
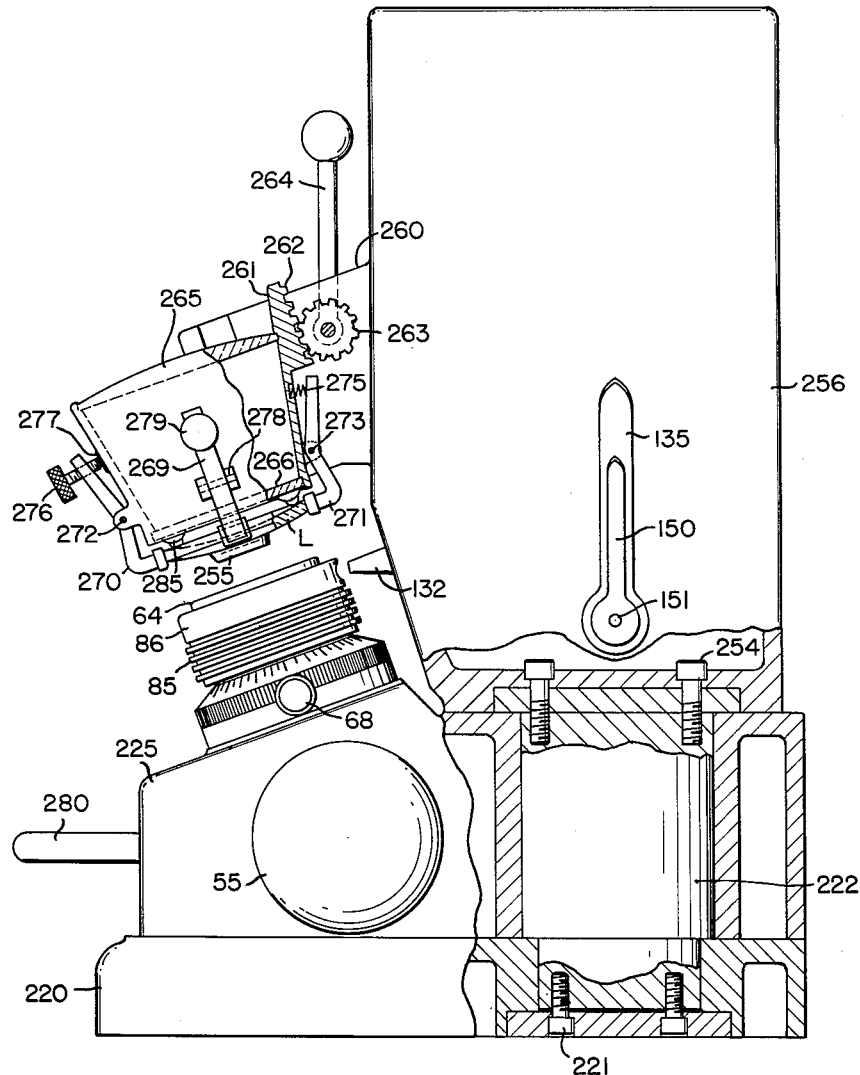
FIG. 9 is a side elevation, with parts broken away, of a lens blocker built according to another embodiment of this invention, and showing the turret of this machine swung into position to mold the block on the lens.
Figure 13:
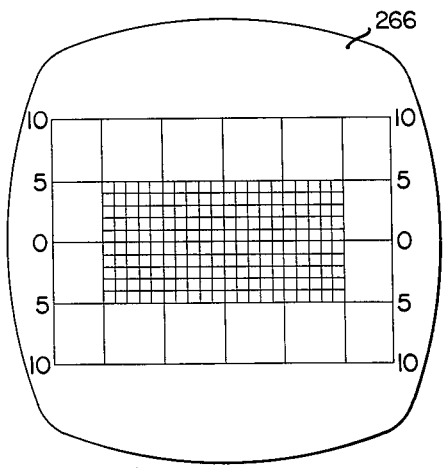
FIG. 13 is a view of a grid such as may be used in the turret position of FIG. 12 for positioning the lens on its surfacing center.

The two jaws 270 and 271 form a pair for adjusting the lens on support 261 rectilinearly in one direction, that is, in a direction parallel to the plane of the paper in FIG. 9. For this adjustment screw 276 is adjusted; spring 275 helps shift the lens.

The jaw 269 is similar to jaw 270. It is pivoted by pin 278 on support 261. It is adjustable by screw 279, similar to screw 276. Diametrally opposite it is a jaw similar to jaw 271. This is actuated by a spring, similar to spring 275. Adjustment of screw 279 will move the lens in a direction at right angles to the plane of the drawing of FIG. 9. The two rectilinear adjustments therefore permit of correctly locating the surfacing center of the lens by use of grid 266.

Rubber tipped pins 285, similar to pins 195, serve too as seats for the lens.

Figure 14:
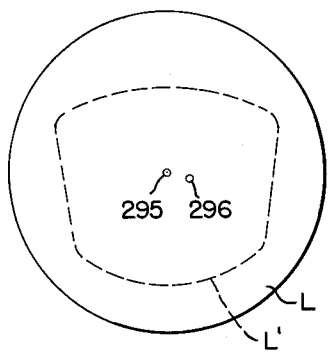
FIG. 14 is a front elevation of a lens blank showing in dotted lines the outline of the finished lens, and indicating the positions of the optical and surfacing centers of the lens.

In operation of the apparatus shown in FIGS. 9 to 13 inclusive, the turret is first indexed to bring the reflector 226 under the lens holder and the lens L is adjusted visually to its surfacing center 295 (FIG. 14) using the grid 266 and the light from the bulb 227 (FIGS. 10 and 11). Then the turret is swung manually by the handle 280 (FIG. 10), which is fixed in the front wall of the turret, to bring the block holder 230 under the head 261. The disc or block 255 is then adjusted by adjustment of the head 230 until its center is on the finishing center 295 of the lens in proper relation to the surfacing center 296 (FIG. 14) of the lens. The head 261 is then lowered, by manipulation of lever 265 to affix the disc or block to the lens. The disc or block 255 may be metal, in which case, pitch may be used to affix the disc or block to the lens, or it may be made of plastic and a suitable adhesive used to affix the disc or block to the lens.

The lens is positioned on the central section of the two-piece disc or block on a center and axis corresponding to that on which it is mounted in the spectacle frame in which it is to be used.

Figure 15:
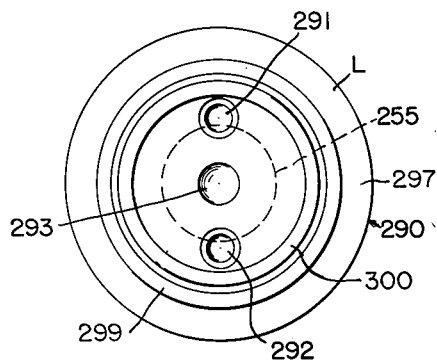
FIG. 15 is a view, similar to FIG. 7, but showing a lens block made according to a modification of the invention and by the machine of FIGS. 9 to 12 inclusive, a lens being shown mounted on the block.
Figure 16:
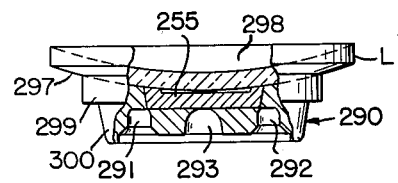
FIG. 16 is a part side elevation, part diametral view of this lens and block.

After the block has been adhered to the lens L, the turret 225 is swung by its handle 280 to bring the mold 23 (FIG. 2) under the head 261, the cylinder and receptacle 120 are moved forward to bring the nozzle 132 into the nozzle seat 75, and the valve rod 145 is opened to allow the molten metal to flow into the mold cavity 30, after the axis and prism adjustments have been made, to mold a low melting point block 290 (FIGS. 15 and 16) around the disc or block 255, having a head 299, to which the underface 297 of the lens blank is attached, and a shank 300, by which the block 290 may be secured in a chuck. In the molding operation, then, a removable surfacing block 290 (FIGS. 15 and 16) is attached to the lens around the finishing disc or block 255. The center of this disc or block is at 296. If the disc or block 255 is made of metal it will be relatively thick, approximately ⅛ inch; whereas if it is plastic, it can be very thin, approximately .005 inch. The adhesive for attaching the disc or block 255 to the lens can range from pitch to a pressure-sensitive backing.

The blocking operation illustrated in FIGS. 9 to 13 inclusive permits of positioning the lens blank on blocks for finishing and for surfacing prior to any operation on the lens blank. The disc or block 255 is used for edging, and is positioned relative to the outer portion 290 of the disc or block to locate the optical center 295 (FIG. 14) and axis of the lens properly for the surfacing processes.

When the lens has been generated, fined and polished, in accordance with conventional surface inspection techniques, the outer portion 299 of the block is removed and the lens is cut and edged and framed.

The modification of the invention illustrated in FIGS. 9 to 16 inclusive is predicated on the use of a low melt alloy for molding the surfacing block 290 and, if metal is used, a medium melt alloy for the finishing disc or block 255.

In molding the block 290, pins similar to pins 36 (FIG. 2) will be mounted in piston 28 to form the recesses 291, 292 (FIGS. 15 and 16) in the shank 300 of the lens block. By these recesses the lens block and the lens carried thereby may be chucked in the surfacing machine. However, a central pin will be used which has only a dome-shaped head. This pin will form a recess 293 in the bottom of the lens block 290 adapted to receive the driving pin of a surfacer when forming an upper spherical surface 297 on the lens.

While the invention has been described in connection with two different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. The method of blocking a lens blank which comprises adhering a disc to one side of the blank, then seating the blank with the adhered disc on a mold which is open at its top and which is shaped to form a block on which the lens blank may be chucked in a machine for operating on the lens blank, with said disc and said one side of the blank covering and closing the mold cavity, flowing a molten metal into the mold cavity until the metal covers said disc and is in engagement with said one side of the blank around said disc, and cooling the metal to adhere it to said disc and to said one side of the blank.

2. The method of forming a block on a lens blank by which the lens blank may be chucked in a machine for operating on the lens blank, which comprises seating the blank on a mold, which has a cavity shaped to form the block, with one side of the blank closing the mold cavity, and flowing a molten metal into the mold cavity until the metal is in engagement with said one side of the blank while maintaining an opening through the metal to said one side thereby to provide an opening in the block being formed through which a gauging member can be inserted, after formation of the block, to contact said one side of the blank, and thereafter cooling the metal to adhere it to said one side of the blank and complete the formation of the block.

3. The method of blocking a lens blank which comprises adhering a disc to one side of the blank with an adherent and with the axis of the disc offset from the finishing center of the lens blank and passing through the surfacing center of the lens blank, then seating the blank with the adhered disc on a mold with said one side of the blank closing the mold cavity, flowing a molten metal into the mold cavity until the metal covers said disc and is in engagement with said one side of the blank around said disc, and cooling the metal to adhere it to said disc and to said one side of the blank, the melting point of said metal being below the melting point of said disc and of said adherent.

4. The method of affixing a lens blank to a lens block which comprises seating the blank on a mold, which has a mold cavity and means projecting into said cavity for forming on said blank means for locating said blank angularly in a lens manufacturing machine, so that one side of the blank closes the mold cavity, rotatably adjusting said forming means in the mold cavity in accordance with the desired axis of the lens, tiltably adjusting the blank relative to the mold in accordance with the prism desired in the lens, then flowing a molten metal into the mold cavity to fill said cavity and until the metal is in engagement with said one side of the blank, and cooling the metal to adhere it to said one side of the blank.

5. The method of blocking a lens blank which comprises locating the optical center of the blank by an optical sighting device, adjusting a chucking disc relative to said blank so that the center of said disc is offset from said optical center and passes through the finishing center of the lens blank, adhering the disc to one side of the blank in said adjusted position, then seating the blank with the adhered disc on a mold so that said disc and said one side of the blank close the mold cavity, flowing a molten metal into the mold cavity until the metal covers said disc and is in engagement with said one side of the blank around said disc, and cooling the metal to adhere it to said disc and to said one side of the blank.

6. Apparatus for making a lens block comprising a mold having a cavity open at its upper end, an annular seal around the upper end of said cavity, means for clamping a lens blank against said seal so that said lens blank covers and closes said cavity, means for tilting said seal relative to other parts of said mold to tilt the lens blank in accordance with the prism desired in the lens, and means for supplying molten metal to said cavity to mold the lens block and adhere it to the lens blank.

7. Apparatus for making a lens block comprising a mold having a cavity open at its upper end, an annular seal around the upper end of said cavity, means for clamping a lens blank against said seal so that the lens blank covers and closes said cavity, and means for tilting said seal to position the lens blank in accordance with the prism desired in the lens comprising a first ring, a plurality of pins which are spaced angularly about the mold cavity and which seat at their lower ends on said first ring and which are secured at their upper ends to said seal, a second ring rotatably adjustable on said mold and in which said first ring is pivotally mounted for adjustment about an axis disposed at right angles to the axis of said second ring, a cam rotatably mounted in said second ring with its axis at right angles to the axes of both rings, said cam being positioned to engage said first ring at a point spaced from the pivotal axis of said first ring, and a spring positioned in said mold to engage said first ring at a point diametrally opposite said cam.

8. Apparatus for making a lens block comprising a mold having a cavity, an annular seal around said cavity, means for clamping a lens blank against said seal, a member rotatably mounted in said mold about an axis disposed approximately centrally of said cavity, a plurality of pins secured to said member to project into said cavity, and means for supplying molten metal to said cavity for molding the lens block in said cavity and adhering it to the lens blank, said pins producing recesses in said block by which it may be driven in a lens manufacturing machine.

9. Apparatus for making a lens block as claimed in claim 8, wherein said member is mounted in said mold to be movable in one direction axially to strip the molded lens block from said cavity.

10. Apparatus for making a lens block comprising a mold having a cavity, an annular seal around said cavity, means for clamping a lens blank against said seal, a piston rotatably mounted in said mold about an axis disposed approximately centrally of said cavity, said piston being also movable in said mold in the direction of said axis, a plurality of pins secured to said piston to project into said cavity, a ring rotatably mounted on said mold about said axis, a cam rotatable in said ring for rotation about an axis extending at right angles to the first-named axis, and means including a pin reciprocable in the direction of the first-named axis and operatively connected at one end to said cam and at its opposite end to said seal for tilting said seal in accordance with the prism desired in said lens, means for supplying molten metal to said cavity for molding a lens block in said cavity and adhering it to said lens blank, and means for moving said piston axially in one direction to strip the molded lens block from said cavity.

11. Apparatus for making a lens block comprising a base, a column projecting upwardly from said base, a mold mounted on said base and having a cavity open at its top, an annular seal around the top of said cavity, an annular sighting device mounted on said column in alignment with said mold and movable toward and from the top of said mold, means carried by said device for clamping a lens blank against said seal to cover and close said cavity when said device is moved toward said mold, means for tiltably adjusting said seal to tilt the lens blank on said mold in accordance with the prism desired in the finished lens, and means for supplying molten metal to said cavity for molding said lens block in said cavity and adhering it to said lens blank.

12. Apparatus for making a lens block comprising a base, a column projecting upwardly from said base, a mold mounted on said base and having a cavity, an annular seal around said cavity, an optical sighting device mounted on said column in alignment with said mold and movable toward and from said mold, means carried by said device for clamping a lens blank against said seal when said device is moved toward said mold, means for tiltably adjusting said seal to tilt the lens blank on said mold in accordance with the prism desired in the finished lens, means projecting into said mold for forming locating recesses in the lens block for drivingly locating the block in a lens manufacturing machine, means for rotatably adjusting said projecting means about the center of said cavity, and means for supplying molten metal to said cavity for molding the lens block in said cavity and adhering it to said lens blank.

13. Apparatus for making a lens block comprising a base, a column projecting upwardly from said base, a mold mounted on said base and having a cavity open at its upper end, an annular seal around said cavity, an ocular sighting device mounted on said column for locating a lens blank on said mold, means for clamping the lens blank against said seal, means for adjusting said lens blank laterally relative to said sighting device, and means for supplying molten metal to said cavity to mold a lens block in said cavity and adhere it to the lens blank.

14. Apparatus for making a lens block comprising a base, a column projecting upwardly from said base, a turret rotatably mounted on said base, an ocular sighting device mounted on said column, means for releasably holding a lens blank beneath said sighting device and for adjusting said lens blank relative to said sighting device, a support adjustably mounted on said turret, means for mounting a lens block on said support, means for indexing said turret to register the lens block with said sighting device, means for adjusting said support to dispose the center of said lens block in a predetermined relation to the axis of said sighting device, means for moving said holding means relative to said support to secure said lens block to said lens blank, a mold mounted on said turret to be indexable into registry with said holding means, said mold having a mold cavity to receive said lens block, and means for supplying molten metal into said mold cavity to form a second lens block around the first-named lens block and to adhere said second lens block to said first-named lens block and said lens blank.

15. Apparatus for making a lens block, comprising a base, a column projecting upwardly from said base, a turret rotatably mounted on said base, an ocular sighting device mounted on said column, means for releasably holding a lens blank beneath said sighting device and for adjusting said lens blank relative to said sighting device, a support adjustably mounted on said turret for adjustment rectilinearly thereon in two directions at right angles to one another, means for securing a first lens block to said support, a mold mounted in said turret and having a mold cavity, said turret being indexable to bring said support and mold successively into registry with said sighting device, means for moving said holding means relatively toward said support to adhere said lens block to said lens blank when said support is in registry with said sighting device, a tank reciprocable on said column and adapted to hold a supply of molten metal, a nozzle secured to said tank and communicating therewith, and means for moving said tank on said column when said mold is in registry with said sighting device to supply molten metal to said mold cavity to mold a second lens block around the first-named lens block and to adhere said second lens block to said first-named lens block and to said lens blank.

References Cited in the file of this patent

UNITED STATES PATENTS

| | | |
|---|---|---|
| 1,318,404 | Penn | Oct. 14, 1919 |
| 2,031,380 | McCabe | Feb. 18, 1936 |
| 2,471,661 | Stevenson | May 31, 1949 |
| 2,661,498 | Blaurock | Dec. 8, 1953 |
| 2,688,168 | Hurt | Sept. 7, 1954 |
| 2,683,339 | Ambrose | July 13, 1954 |
| 2,718,040 | Glynn | Sept. 20, 1955 |
| 2,804,663 | Harter et al. | Sept. 3, 1957 |
| 2,842,905 | Rolin | July 15, 1958 |
| 2,848,770 | Schuchardt | Aug. 26, 1958 |
| 2,887,746 | Bogoff | May 26, 1959 |